United States Patent [19]

MacKenzie et al.

[11] Patent Number: 5,029,337
[45] Date of Patent: Jul. 2, 1991

[54] METHOD FOR MEASURING COATING THICKNESS

[75] Inventors: Innes K. MacKenzie, Guelph; Robert J. Stone, Dutton, both of Canada

[73] Assignee: Tava Corporation, London, Canada

[21] Appl. No.: 453,848

[22] Filed: Dec. 20, 1989

[30] Foreign Application Priority Data

Jan. 19, 1989 [CA] Canada .................................. 588709

[51] Int. Cl.⁵ ..................... G01B 15/02; G01N 23/223
[52] U.S. Cl. ......................................... 378/90; 378/89; 378/56; 378/49; 378/50; 378/54; 378/44
[58] Field of Search ....................... 378/50, 54, 53, 44, 378/45, 90, 87, 89, 70, 71, 56, 83, 48, 49

[56] References Cited

U.S. PATENT DOCUMENTS 3,703,726 11/1972 Stephenson ........................... 378/48

Primary Examiner—Edward P. Westin
Assistant Examiner—Don Wong
Attorney, Agent, or Firm—Fleit, Jacobson, Cohn, Price, Holman & Stern

[57] ABSTRACT

A method of measuring a coating thickness applied on a target of constant base material, such coating containing a non-radioactive labelling material having an atomic number higher than 20. The method includes applying a source of constant gamma or x-rays substantially perpendicular from the center of the face of a detector to a target of unknown coating and to a calibration target of the same base material of known coating to cause the labelling material to emit characteristic fluorescent x-ray ranges from 4-90 kev, measuring the fluorescent x-ray and compton yields of the calibration target, measuring the fluorescent x-ray and compton yields of the target of unknown coating, deriving the source-target distance for the unknown coating from the compton yields, deriving the expected fluorescent x-ray of the calibration target of known coating at said distance, and comparing the measured fluorescent x-ray for the unknown coating to the expected fluorescent x-ray derived at said distance to obtain the coating thickness for the unknown coating. The constant source may be eliminated by measuring the ratio of compton and Rayleigh yields. For targets of variable base thickness, the center of the compton profile is measured.

11 Claims, 4 Drawing Sheets

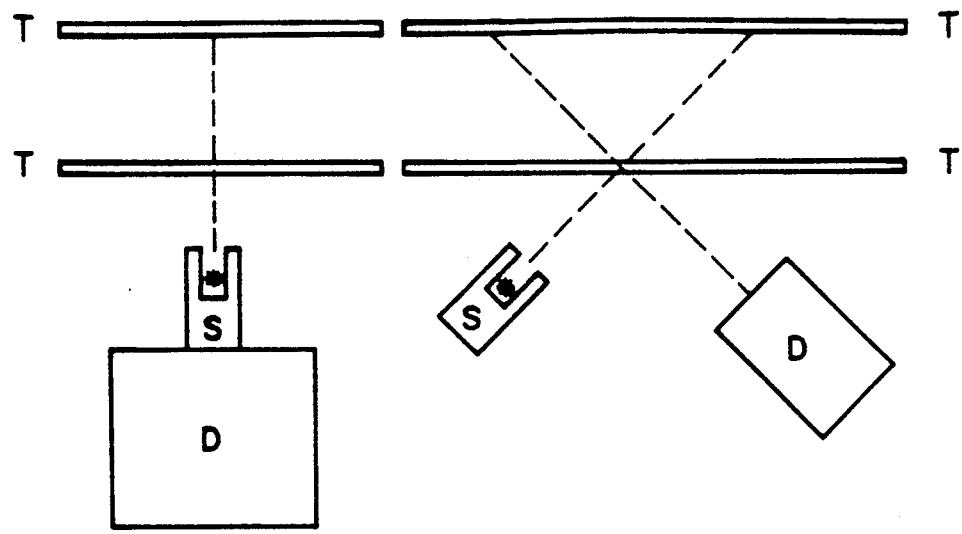
Fig. la          Fig. lb
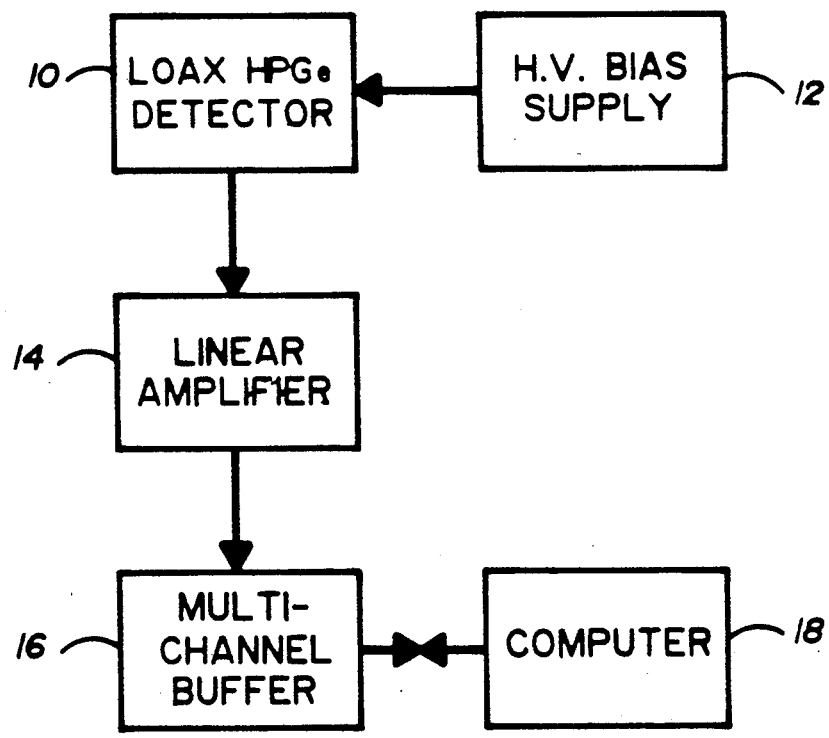
Fig. 2

METHOD FOR MEASURING COATING THICKNESS

This invention relates to a method for measuring coating thickness, more particularly the thickness of a coating of paint applied on a base material.

It is known in the prior art such as disclosed in U.S. Pat. Nos. 4,129,778; 4,147,931; 4,377,869 and 4,458,360 that the thickness of a coating layer on a base material can be measured using X-Ray fluorescence. In practice a primary X-Ray source, either a radioisotope or X-Ray tube, excites fluorescent radiation in suitable elements present in the coating layers or in the base material. The coating thickness can then be derived from the secondary X-Ray yields or in some instances by the combination of secondary X-Ray yields and the absorption of the primary radiation. The fluoresced elements can be present either as a normal constituent of the coating or base material or as a constituent of a purposely added marker substance.

The prior art is encumbered by the necessity for fixed source/target/detector geometry. Thus the prior art is only applicable in cases where fixed geometry is easily attained such as in the coating thickness measurement of materials on a conveyor belt.

It is therefore the object of the present invention to overcome the above problem by using an axially symmetric backscatter geometry and exploiting Compton and Rayleigh scattered radiations in addition to X-Ray fluorescence to detect coating thickness.

The method, in accordance with the present invention for measuring the thickness of a coating applied to a target of constant base material thickness, such coating containing a non-radioactive labelling material having an atomic number higher than 20, comprises applying substantially perpendicularly to the target of unknown coating thickness and to a calibration target of the same base material thickness and known coating thickness gamma or X-Rays from a constant radioisotope or X-Ray source located at the center of the face of a detector to cause the labelling material to emit characteristic fluorescent X-Rays in the energy band of 4–90 kev, measuring the fluorescent X-Ray and Compton yields of the calibration target for known source-target distances, measuring the fluorescent X-Ray and Compton yields of the target of unknown coating thickness for any unknown source-target distance, deriving the source-target distance of the target of unknown coating thickness from the Compton yield, deriving the expected fluorescent X-Ray yield of the calibration target of known coating thickness at such distance, and comparing the measured fluorescent X-Ray yield for the target of unknown coating thickness to the expected fluorescent X-Ray yield derived at such distance to obtain the coating thickness of the target of unknown coating thickness.

An alternative method of measuring a coating thickness applied on a target of constant base material thickness, such coating containing a non-radioactive labelling material having an atomic number higher than 20 comprises applying substantially perpendicularly to the target of unknown coating thickness and to a calibration target of the same base material thickness and known coating thickness gamma or X-Rays from a radioisotope or X-Ray source located at the center of the face of a detector to cause the labelling material to emit characteristic fluorescent X-Rays in the energy band of 4–90 kev, measuring the ratio of the Compton and Rayleigh yields and the ratio of fluorescent X-Ray and Compton yields of the calibration target for known source target distances, measuring the ratio of the Compton and Rayleigh yields and the ratio of the fluorescent X-Ray and Compton yields of the target of unknown coating thickness for any unknown source-target distance, deriving the source-target distance of the target of unknown coating thickness from the measured Compton/Rayleigh ratio, deriving the expected fluorescent X-Ray/Compton ratio of the calibration target of known thickness at such distance, and comparing the measured fluorescent X-Ray/Compton ratio for the target of unknown coating thickness to the expected fluorescent X-Ray/Compton ratio derived at such distance to obtain the coating thickness of the target of unknown coating thickness.

The above method has the advantage of not requiring a source of constant intensity, as the measurements use the ratio of the Compton and Rayleigh yields.

A third method of measuring a coating thickness applied to a target is applicable to a target of variable base material thickness. The method comprises applying substantially perpendicularly to the target of unknown coating thickness and to a calibration target of the same base material and known coating thickness gamma or X-Rays from a constant radioisotope or X-Ray source located at the center of the face of a detector to cause the labelling material to emit characteristic fluorescent X-Rays in the energy band of 4–90 kev, measuring the fluorescent X-Ray yield and the center of the Compton profile of the calibration target for known source-target distances, measuring the fluorescent X-Ray yield and the center of the Compton profile of the target of unknown coating thickness for any unknown source-target distance, deriving the source-target distance of the target of unknown coating thickness from the measured center of the Compton profile, deriving the expected fluorescent X-Ray yield of the calibration target of known coating thickness at such distance, and comparing the measured fluorescent X-Ray yield for the target of unknown coating thickness to the expected fluorescent X-Ray yield at such distance to obtain the coating thickness of the target of unknown coating thickness.

The source may be Americium 241 and the labelling material an element having an atomic number between 20 and 58.

The source may alternatively be Cadmium 109 and the labelling material a material having an atomic number between 20 and 42 or between 48 and 64.

The source may also be a molybdenum anode X-ray tube and the labelling material an element having an atomic number between 20 and 39.

The detector used to measure the fluorescent X-Ray, Compton and Rayleigh yields is preferably an intrinsic germanium detector.

A multichannel or several single channel analysers may be used to measure fluorescent X-Ray, Compton or Rayleigh yields.

More than one coating thickness on the same target may be measured using a different labelling material in each coating.

The invention will now be disclosed, by way of example, with reference to the accompanying drawings in which:

FIGS. 1a and 1b are diagrams illustrating the source, target, detector arrangement in accordance with the present invention a compared to the prior art;

FIG. 2 is a block diagram of the system used for measuring coating thickness;

The source/target/detector arrangement used in the present invention is shown in FIG. 1a and consists of a source in shield S mounted in the center of a large cylindrical detector D facing a target T. As the target moves away from the source/detector assembly, the source illuminates and the detector samples the same area of the target which means that the source/detector assembly is geometry independent in contrast to the prior art assembly shown in FIG. 1b and disclosed in the above mentioned U.S. Pat. No. 4,377,869, for example. In the source/detector assembly shown in FIG. 1b, the detector would not sample the same area as the one illuminated by the source if the target were displaced. Thus the prior art source/detector assembly shown in FIG. 1b is only applicable to a fixed geometry where the source-target distance is fixed. The geometry used in the present invention therefore has the ability to take readings without fixed positions of source, target and detector. This advantage effectively makes the method of measuring coating thickness in accordance with the present invention applicable to a number of applications where the exact geometry between source, target and detector cannot be maintained, such as in the car painting industry, for example.

Figure 3:
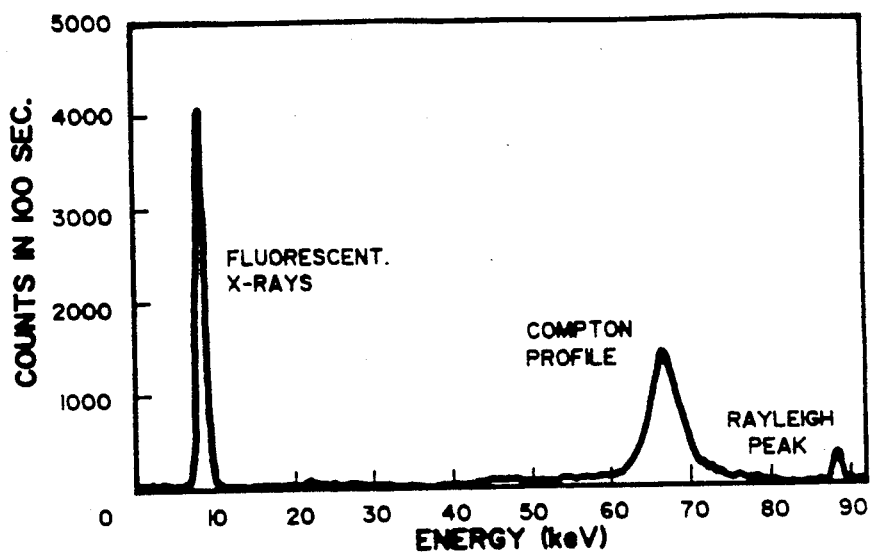
FIG. 3 is a typical backcatter spectrum of copper with a cadmium 109 source.

FIG. 2 illustrates a block diagram of an apparatus used in the present measuring method. The apparatus consists of a LOAX hyperpure Ge detector 10 which is biased by a high voltage supply 12 and the output of which is connected to a linear amplifier 14. A multi-channel buffer 16 consisting of an analog to digital converter and a multichannel analyser is connected to the output of the amplifier and controlled by a computer 18 for obtaining the required measurements. The source may be a several milli-Curie source of Americium 241 or Cadmium 109 positioned in a shielding post which prevents primary radiation from hitting the detector directly, as shown in FIG. 1a. The target is placed in front of the detector parallel to the detector face. A spectrum similar to that shown in FIG. 3 may be obtained for copper with Cadmium 109. The expected fluorescent X-Ray yield is determined by performing a calibration with a target of known coating thickness. With this calibration the coating thickness is found by one of three methods.

Figure 4:
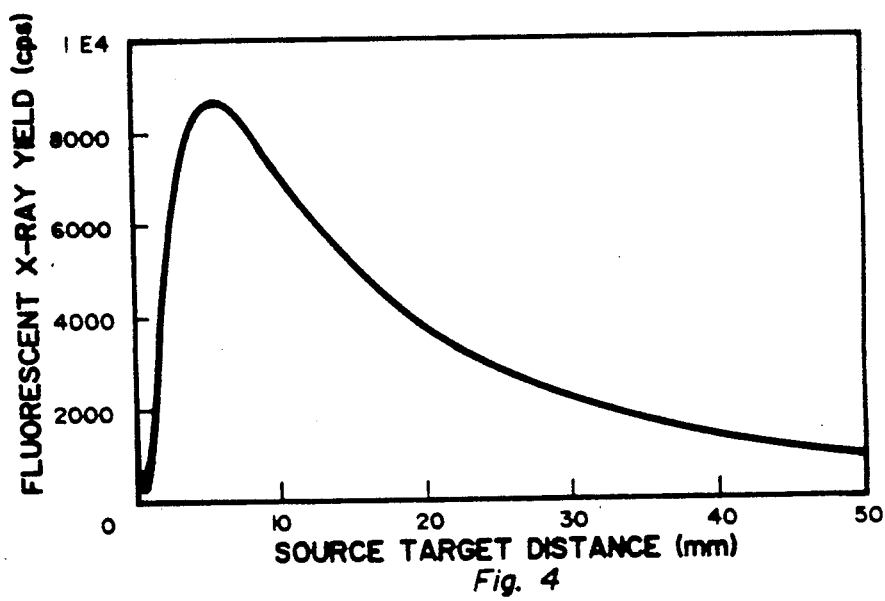
FIGS. 4 and 5 show Ba X-Ray and Compton yields versus source-target distances with a calibration sample of known coating thickness.
Figure 5:
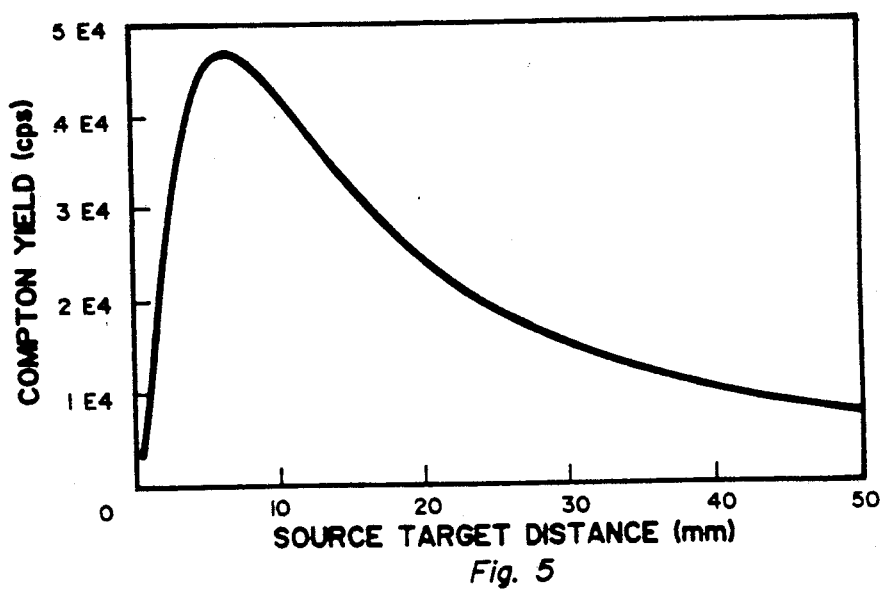

Following the first method, calibration is done with a source of constant intensity on a calibration target of known base material thickness and known coating thickness containing a labelling material, such as barium. The raw Ba X-ray and Compton yields (area under fluorescent X-Ray and Compton peaks) are measured for known source-target distances as illustrated in FIGS. 4 and 5. The data obtained from such measurement is stored in the computer as expected or standard data for calibration. The same measurements are done on a target of unknown coating thickness containing the same labelling material and placed at any unknown source-target distance. The source-target distance of the sample of unknown coating thickness is derived from the Compton yield which is the same for the target of known and unknown coating thickness since the Compton yield is relatively independent of coating thickness. The expected fluorescent X-Ray yield of the target of known coating thickness at such distance is then derived. The measured fluorescent X-Ray yield for the target of unknown coating thickness is then compared to the expected fluorescent X-Ray yield at such distance to obtain the coating thickness of the target of unknown coating thickness.

Figure 6:
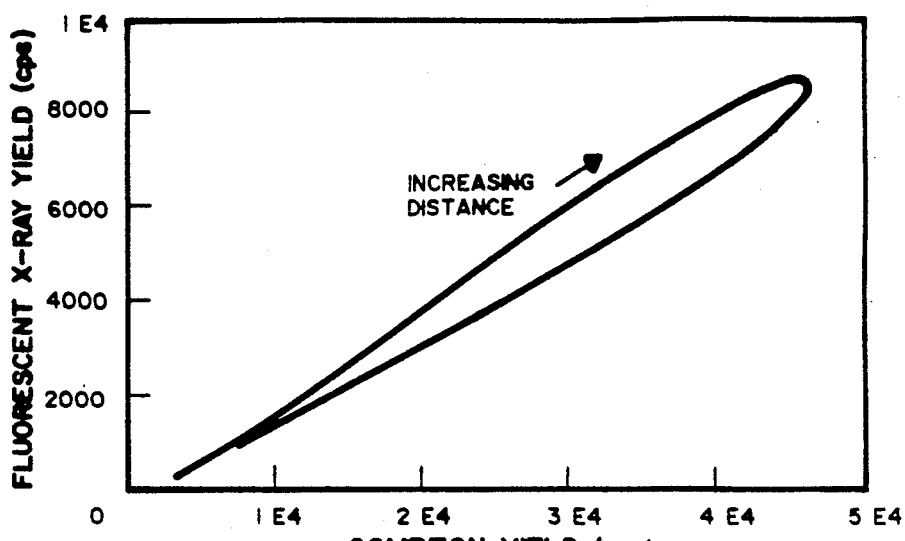
FIG. 6 shows an X-Ray versus Compton yield at various source target distances.

The unknown coating thickness is then:

$$T_m = \frac{F_m}{F_s} T_s$$

where $T_m$, $T_s$ are the unknown and known coating thickness and $F_m$, $F_s$ are the measured and expected areas under the fluorescent peak, respectively The data contained in FIGS. 4 and 5 may be combined for deriving directly the expected X-Ray yield corresponding to the Compton yield at various source target distances as shown in FIG. 6 of the drawings.

Figure 7:
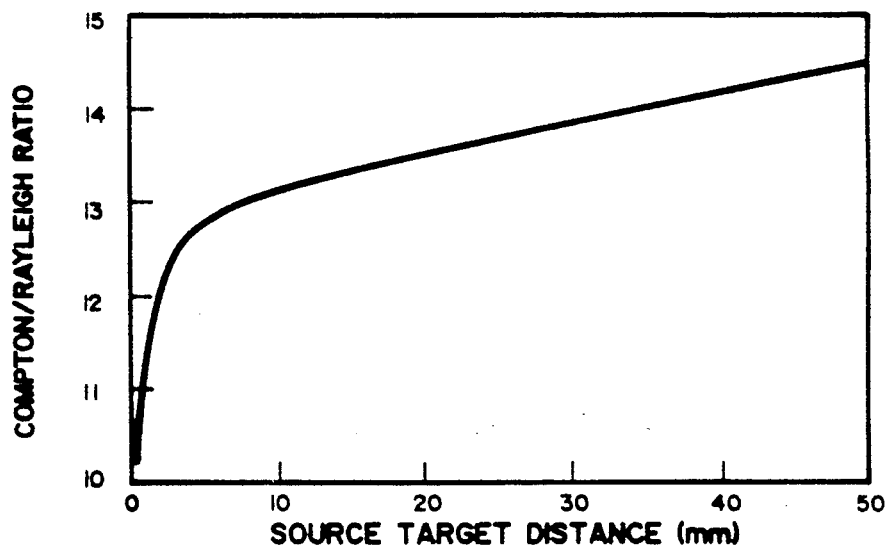
FIGS. 7 and 8 show a Compton/Rayleigh yield ratio and a X-Ray/Compton yield ratio versus source-target distances with a calibration target of known coating thickness.
Figure 8:
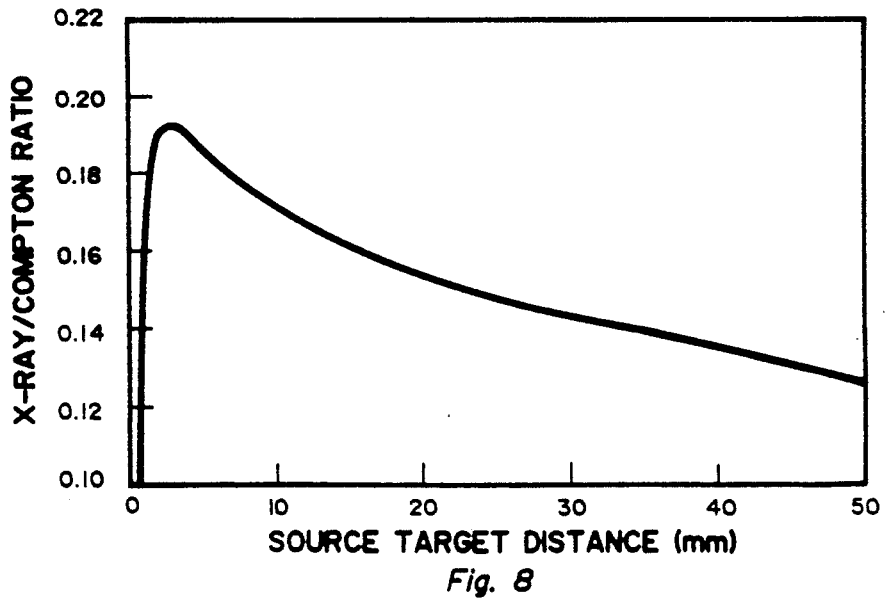

Following the second method, calibration is done with a calibration target of constant base material thickness and coating thickness. The ratio of the Compton and Rayleigh yields and the ratio of the fluorescent X-Ray and Compton yields for known source target distances are measured as illustrated in FIGS. 7 and 8. These data are stored in the computer as expected or standard data for calibration. The same measurements are done on the target of unknown coating thickness at any unknown source target distance. The unknown source-target distance is derived from the Compton/Rayleigh ratio as it is relatively independent of coating thickness. The expected fluorescent X-Ray/Compton ratio of the calibration target of known coating thickness is derived at such distance. The measured fluorescent X-Ray/Compton ratio for the target of unknown coating thickness is then compared to the fluorescent X-Ray/Compton ratio at such distance to obtain the coating thickness of the target of unknown coating thickness.

Figure 9:
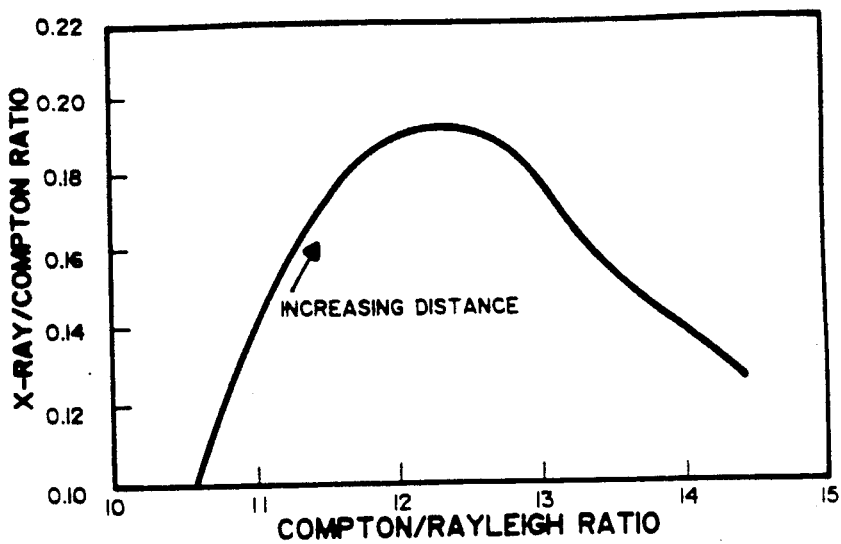
FIG. 9 shows a X-ray/Compton yield ratio versus Compton/Rayleigh yield ratio for various source-target distances.

The unknown coating thickness is then:

$$T_m = \frac{F/C)_m}{F/C)_s} T_s$$

where F/C)m and F/C)s are the measured and expected fluorescent X-Ray/Compton ratios The data obtained in FIGS. 7 and 8 may be combined for deriving the expected fluorescent X-Ray/Compton ratio corresponding to the Compton/Rayleigh ratio at various source target distances as illustrated in FIG. 9.

Figure 10:
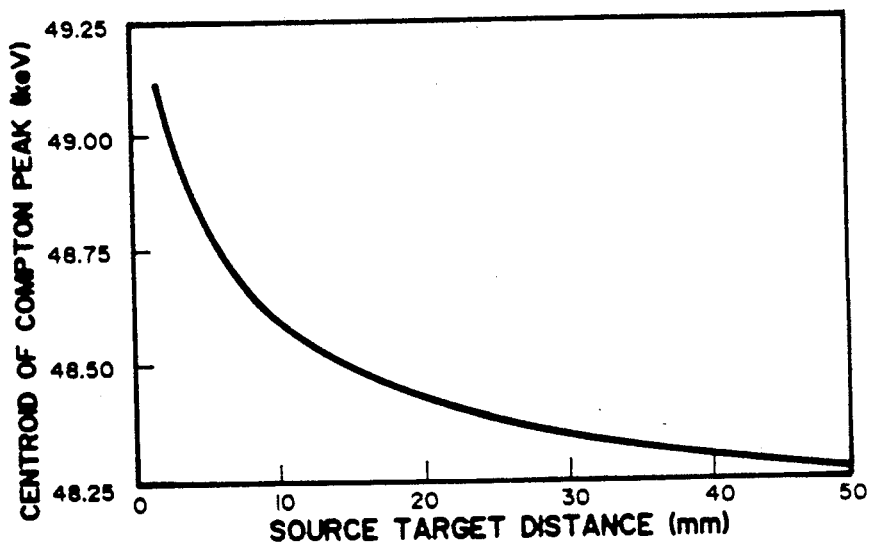
FIG. 10 shows the centroid of the Compton peak for various source target distances.

Following the third method, calibration is done with a source of known intensity and a calibration target of known coating thickness. The thickness of the base material may vary and need not be constant as with the first two methods. In accordance with this method, the fluorescent X-Ray yield and the center of the Compton profile of the calibration target for known source-target distances are measured as illustrated in FIGS. 4 and 10 and the data stored in the computer. The same measurements are done on the target of unknown coating thickness at any unknown source-target distance. The center of the Compton peak gives the source-target distance which in turn gives the expected fluorescent X-Ray yield. The unknown coating thickness is then $$T_m = \frac{Fm}{Fs} T_s$$

Figure 11:
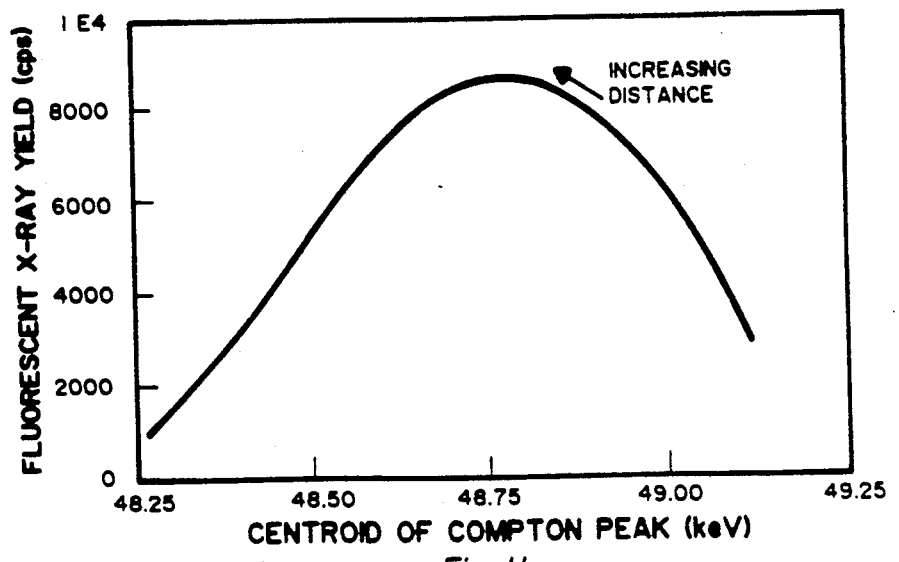
FIG. 11 shows the X-ray yield versus the centroid of the Compton peak.

The data contained in FIGS. 4 and 10 may be combined for deriving directly the expected X-ray yield corresponding to the centre of the Compton peak at various source-target distances as shown in FIG. 11.

A LOAX detector made by EGG Ortec is a preferred intrinsic Ge detector because of its large area and low background compared to a standard planar Ge detector. In general, any labelling material with atomic number greater than 20 can be used. In practice, elements whose X-Rays fall in the valley between 15 and 35 kev are optimum. These are elements number 39 (Y) through 58 (Ce). In addition, the X-Ray yield for a given concentration of labelling material increases with atomic number so those nearer Z=58 are best.

In the present invention, a measurement of the thickness of a Ba-containing primer on steel can be made to a precision of p5% at the 97% confidence level in 0.22 sec. The concentration of barium compound in this case is 13%. If the concentration were only 1%, the measurement would take 4.4 sec.

We claim:

1. A method of measuring a coating thickness applied on a target of constant base material thickness, said coating containing a non-radioactive labelling material having an atomic number higher than 20, comprising:
   (a) applying substantially perpendicularly to a target of unknown coating thickness and to a calibration target of the same base material thickness and known coating thickness gamma or X-Rays from a constant radioisotope or X-Ray source located at the center of the face of a detector to cause the labelling material to emit characteristic fluorescent X-Ray in the energy band of 4-90 kev;
   (b) measuring fluorescent X-Ray and Compton yields of the calibration target for known source-target distances;
   (c) measuring fluorescent X-Ray and Compton yields of the target of unknown coating thickness for any unknown source-target distance;
   (d) deriving the source-target distance of the target of unknown coating thickness from the Crompton yield;
   (e) deriving an expected fluorescent X-Ray yield of the calibration target of known coating thickness at said source-target distance; and
   (f) comparing the measured fluorescent X-Ray yield for the target of unknown coating thickness to the expected fluorescent X-Ray yield of the calibration target derived at said source-target distance to obtain the coating thickness of the target of unknown coating thickness.

2. A method of measuring a coating thickness applied on a target of constant base material thickness, said coating containing a non-radioactive labelling material having an atomic number higher than 20, comprising:
   (a) applying substantially perpendicularly to a target of unknown coating thickness and to a calibration target of the same base material thickness and known coating thickness gamma or X-Rays from a radioisotope or X-Ray source located at the center of the face of a detector to cause the labelling material to emit characteristic fluorescent X-Rays in the energy band of 4-90 kev;
   (b) measuring a ratio of the Compton and Rayleigh yields and a ratio of fluorescent X-Ray and Compton yields of the calibration target for known source-target distances;
   (c) measuring a ratio of the Compton and Rayleigh yields and a ratio of fluorescent X-Ray and Compton yields of the target of unknown coating thickness for any unknown source-target distance;
   (d) deriving the source-target distance of the target of unknown coating thickness from the measured Compton/Rayleigh ratio;
   (e) deriving an expected fluorescent X-Ray/Compton ratio of the calibration target of known coating thickness at said source-target distance; and
   (f) comparing the measured fluorescent X-Ray/Compton ratio of the target of unknown coating thickness to the expected fluorescent X-Ray/Compton ratio derived at said source-target distance to obtain the coating thickness of the target of unknown thickness.

3. A method of measuring a coating thickness applied to a target of variable base material thickness, said coating containing a non-radioactive labelling material having an atomic number higher than 20, comprising:
   (a) applying substantially perpendicularly to a target of unknown coating thickness and to a calibration target of known coating thickness gamma or X-Rays from a constant radioisotope or X-Ray source located at the center of the face of a detector to cause the labelling material to emit characteristic fluorescent X-Rays in the energy band of 4-90 kev;
   (b) measuring the fluorescent X-Ray yield and the center of the Compton profile of the calibration target for known source-target distances;
   (c) measuring the fluorescent X-Ray yield and the center of the Compton profile of the target of unknown coating thickness for any unknown source-target distance;
   (d) deriving the source-target distance of the target of unknown coating thickness from the measured center of the Compton profile;
   (e) deriving the expected fluorescent X-Ray yield of the target of known coating thickness at said source-target distance; and
   (f) comparing the measured fluorescent X-Ray yield for the target of unknown coating thickness to the expected fluorescent X-Ray yield derived at said source-target distance to obtain the coating thickness of the target of unknown coating thickness.

4. A method as defined in claim 1, wherein the source is Americium 241 and wherein the labeling material has an atomic number between 20 and 58.

5. A method as defined in claim 1, wherein the source is Cadmium 109 and wherein the labelling material has an atomic number between 20 and 42 or between 48 and 64.

6. A method as defined in claim 1, wherein the source is a molybdenum anode X-ray tube and wherein the labelling material has an atomic number between 20 and 39.

7. A method as defined in claim 2, wherein a detector used to measure the fluorescent X-Ray, Compton and Rayleigh yields is an intrinsic germanium detector.

8. A method as defined in claim 2, wherein a multichannel or several single channel analysers are used to measure fluorescent X-Ray, Compton or Rayleigh yields.

9. A method as defined in claim 1, wherein more than one coating thickness on the same target are measured using a different labelling material in each coating.

10. A method as defined in claim 1 wherein a detector used to measure the fluorescent X-Ray and Compton yields is an intrinsic germanium detector.

11. A method as defined in claim 1 wherein a multichannel or several single channel analysers are used to measure fluorescent X-Ray or Compton yields.

* * * * *